(12) United States Patent
Johnson

(10) Patent No.: US 7,926,301 B2
(45) Date of Patent: Apr. 19, 2011

(54) METHOD AND APPARATUS FOR CONTROLLING THE LEVEL OF A MOLTEN MATERIAL IN A GLASS MANUFACTURING SYSTEM

(75) Inventor: William Weston Johnson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 848 days.

(21) Appl. No.: 11/893,450

(22) Filed: Aug. 16, 2007

(65) Prior Publication Data

US 2009/0044567 A1 Feb. 19, 2009

(51) Int. Cl.
*C03B 3/00* (2006.01)
*C03B 5/24* (2006.01)
*C03B 5/26* (2006.01)

(52) U.S. Cl. .................. 65/29.16; 65/29.17; 65/135.9; 65/136.2

(58) Field of Classification Search .............. 65/135.9, 65/136.2, 29.16, 29.17
See application file for complete search history.

(56) References Cited

U.S. PATENT DOCUMENTS

| | | | | |
|---|---|---|---|---|
| 2,246,375 A | * | 6/1941 | Lyle | 414/166 |
| 3,127,033 A | * | 3/1964 | Lyle | 414/166 |
| 3,139,332 A | | 6/1964 | Slayter et al. | |
| 3,208,841 A | | 9/1965 | Burch | |
| 3,325,268 A | | 6/1967 | Penberthy | |
| 3,476,538 A | | 11/1969 | Trethewey | 65/29 |
| 3,573,017 A | | 3/1971 | Griem, Jr. | |
| 3,592,623 A | | 7/1971 | Shepherd | |
| 3,670,908 A | * | 6/1972 | Stevenson | 414/166 |
| 3,954,433 A | | 5/1976 | Holler | 65/29 |
| 3,997,316 A | | 12/1976 | Koontz | 65/136 |
| 4,028,083 A | | 6/1977 | Patznick et al. | 65/29 |
| 4,725,299 A | | 2/1988 | Khinkis et al. | 65/134 |
| 4,726,830 A | | 2/1988 | Hughes et al. | 65/27 |
| 4,728,352 A | | 3/1988 | Goode et al. | 65/27 |
| 4,789,990 A | | 12/1988 | Pieper | 373/32 |
| 4,820,329 A | | 4/1989 | Gunthner | 65/134 |
| 4,831,633 A | | 5/1989 | Argent | 373/32 |
| 4,852,118 A | | 7/1989 | Pieper | 373/32 |
| 5,120,342 A | | 6/1992 | Richards | 65/178 |
| 5,447,547 A | | 9/1995 | Goldfarb et al. | 65/134.1 |
| 5,588,978 A | * | 12/1996 | Argent et al. | 65/29.1 |
| 5,672,190 A | | 9/1997 | Litka et al. | 65/134.1 |
| 5,827,341 A | | 10/1998 | Whitfield et al. | 65/134.1 |
| 5,979,191 A | | 11/1999 | Jian | 65/490 |
| 6,789,396 B2 | | 9/2004 | Olin-Nunez et al. | 65/134.8 |

FOREIGN PATENT DOCUMENTS

| | | |
|---|---|---|
| JP | 56120522 | 9/1981 |
| JP | 01111749 | 4/1989 |

OTHER PUBLICATIONS

XP-001221275, Automation and Mechanization of Production, V. V. Efremenkov and K. Yu. Subbotin, "Regulation of The Efficiency of Screw Feeders for Glass Batch Components", Oct. 2004, pp. 317-319.

* cited by examiner

*Primary Examiner* — Jason L. Lazorcik
(74) *Attorney, Agent, or Firm* — Kevin M. Able

(57) ABSTRACT

A method of feeding a pulverulent batch material into a furnace in the manufacture of glass. The pulverulent batch material is fed from a first bulk batch feeder at a first batch feed rate, and from a second trim batch feeder at a second trim batch feed rate. The trim batch feed rate is equal to or less than 10% of the total batch feed rate. The use of trim electrodes and trim burners is also disclosed.

15 Claims, 4 Drawing Sheets

METHOD AND APPARATUS FOR CONTROLLING THE LEVEL OF A MOLTEN MATERIAL IN A GLASS MANUFACTURING SYSTEM

BACKGROUND OF THE INVENTION

1. Field of the Invention

This invention relates to a method and an apparatus for maintaining the level of a molten material in a glass manufacturing system, and in particular, for controlling the feed and melting rates of a precursor material as a function of the level of the molten material.

2. Technical Background

In a typical glass manufacturing system, various raw constituent or batch materials, generally in a granular state, are introduced, or "charged" into a melting furnace. The batch materials are melted to form a viscous molten material that can be flowed to a fabrication portion of the system. The viscous molten material, when cooled, forms a glass. For the purposes of discussion and not limitation, the viscous molten material will hereinafter be referred to as molten glass or glass melt.

It is desirable during the course of the melting process that the level of the glass melt in the melting furnace is maintained at a consistent level. If the level of the melt fluctuates excessively, the glass melt can "wash" different areas of the walls of the melting furnace. This is a reasonable concern because the walls of the furnace are generally lined with a refractory brick that dissolves into the melt over a period of time, and thus variations in composition between different areas of the refractory bricks forming the walls may be reflected in the melt. Additionally, various melting by-products may accumulate on the refractory walls over the course of a melting campaign. For example, the surface of the melt is generally covered with unmelted batch materials, and foam resulting from the melting. A fluctuating level may result in an inconsistent chemical composition of the melt, or may incorporate solid refractory and/or batch inclusions in the melt. Finally, a fluctuating level, and the attempt to compensate, can lead to thermal instability of the melt.

Historically, a significant amount of glass manufacturing for glass sheets has been performed in a float system, wherein the precursor materials are first melted in a melting furnace, fined to remove gaseous inclusions, and flowed onto the surface of a second molten medium, typically tin.

More recently, a fusion process has been used to produce exceptionally defect free glass sheets, useful for manufacturing optical displays, wherein the precursor materials are first melted in a melting furnace, then flowed through a system of tubes or pipes and vessels to a forming pipe. The forming pipe comprises an open-top vessel that includes converging forming surfaces. The molten glass overflows the top of the vessel and flows down both sides of the forming vessel, including the converging forming surfaces. The separate flows then rejoin at the line where the converging forming surfaces meet. Thus, molten glass that has been in contact with the refractory surface of the forming pipe is joined within the interior of the formed sheet, wherein the exterior surfaces of the sheet have not been contacted by the forming surfaces. The tubes and vessels between the melting furnace and the forming pipe are typically formed of a refractory metal, such as platinum or a platinum-rhodium alloy, and are collectively referred to as the platinum system.

Pressure drops that occur through the platinum system may vary due to temperature fluctuations within the platinum system, and result in level fluctuations that propagate back to the melting furnace, making fusion-type glass making processes more prone to level fluctuations than other processes. Generally, measuring the level of the glass in the melting furnace directly is difficult due to the aforementioned melting by-products: the molten glass in the melting furnace may not present a well-defined surface. Thus, indirect methods may used. Typically, level control is implemented by varying the rate of batch material feed to the furnace. However, a typical screw-type batch feeder is generally a high capacity apparatus that lacks the fine control necessary to maintain adequate level control without overshooting the target level, thereby creating additional level fluctuations.

SUMMARY

A method of maintaining a substantially constant level in a melting furnace for the production of molten glass is disclosed. The method incorporates a trim batch feeder that charges only a small percentage of batch material into the furnace when compared to the amount of batch material charged by a larger bulk batch feeder. The use of a small volume feeder allows fine adjustment of the overall feed rate. In accordance with embodiment of the present invention, the one or more bulk batch feeders are operated at a constant output, and variations to the batch feed rate accomplished by varying the output of the smaller trim feeder. However, if larger changes to the overall feed rate are needed, the output of the bulk feeder(s) may also be varied.

Variations to the feed rate may also result in changes to the temperature of the batch blanket and the molten glass beneath the blanket. Consequently, the present invention may further contemplate the use of trim heaters for the purpose of varying the temperature of the melt in small increments. Methods of heating the melt include both fuel-oxidizer heaters (e.g. gas jets overtop the melt), and electric current heaters incorporating electrodes submerged below the surface of the melt.

In one embodiment of the present invention, a method of forming a glass melt is disclosed comprising feeding batch material into a furnace from a bulk batch feeder at a bulk feed rate, feeding batch material into the furnace from a batch trim feeder at a trim feed rate equal to or less than 10% of a total batch feed rate, the total batch feed rate being the sum of the bulk feed rate and the trim feed rate, heating the batch material in the furnace to form a glass melt, sensing a level of the glass melt; and varying the trim feed rate in response to the level of the glass melt while maintaining the bulk feed rate constant.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate an exemplary embodiment of the invention and, together with the description, serve to explain the principles and operations of the invention.

DETAILED DESCRIPTION

Figure 1:
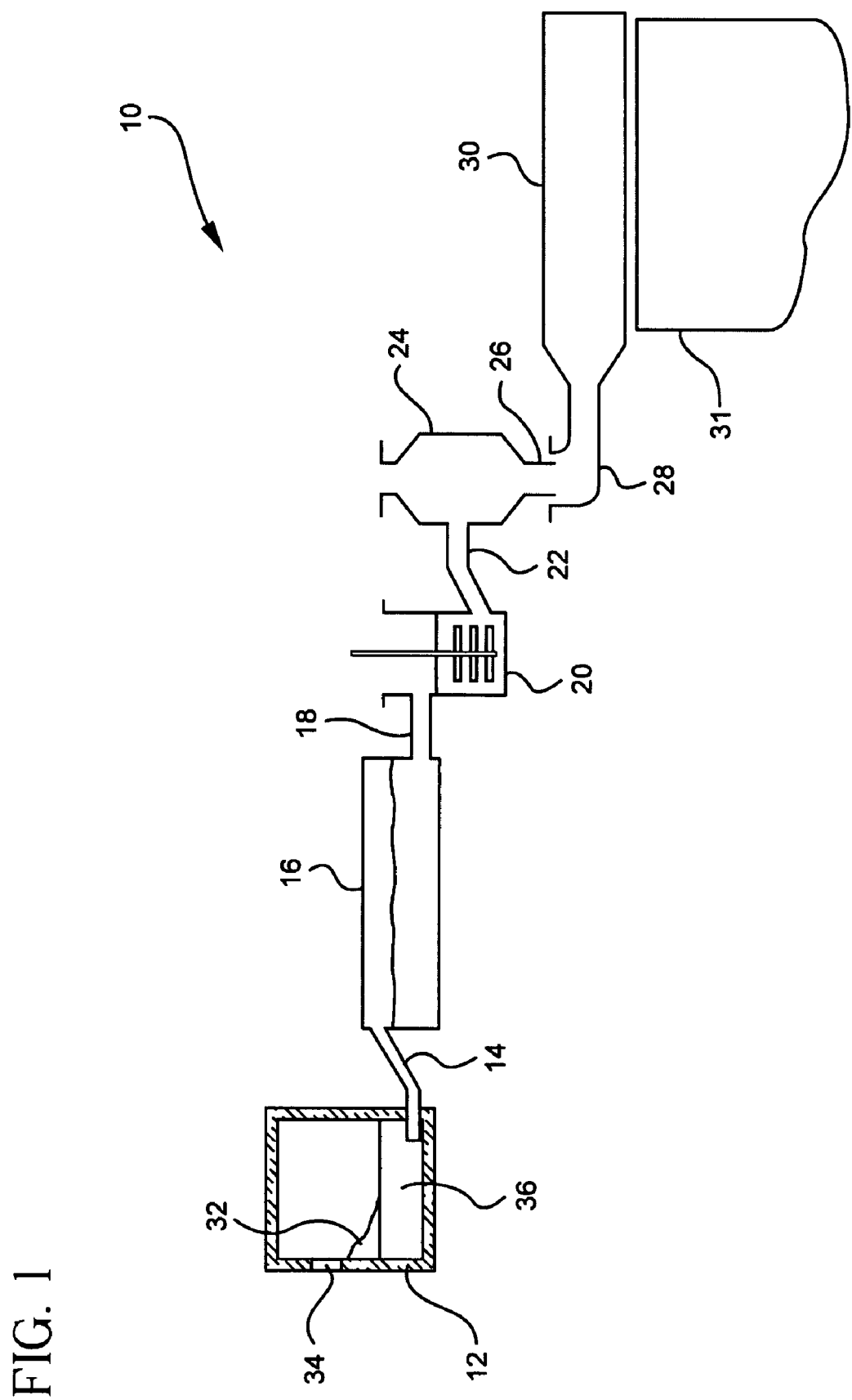
FIG. 1 is a cross sectional side view of an exemplary glass making process according to an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Shown in FIG. 1 is a cross sectional view of an embodiment of a glass making apparatus 10 in accordance with the present invention comprising melting furnace, or "premelter" 12, such as might be used in a fusion glass making process for producing glass sheets. Melting furnace 12 is typically comprised of a refractory material such as alumina or zirconia bricks. In addition to melting furnace 12, apparatus 10 includes melter-to-finer connecting tube (MFC) 14, finer 16, finer to stirrer connecting tube (FSC) 18, stirrer 20, stirrer to bowl connecting tube (SBC) 22, bowl 24, downcomer 26, inlet 28 and forming pipe 30. Batch material 32 is charged into melting furnace 12 through inlet 34, where the batch material is melted to form a molten glass or glass melt 36. Glass melt 36 then flows into finer 16 through MFC 14 to de-gas or "fine" the melt. From finer 16 the glass melt flows through FSC 18 into stirrer 20 where the molten glass is homogenized. Stirrer 20 may, for example, comprise rotating stirrer blades that stretch and cut the molten glass to reduce inhomogenieties. The molten glass flows from the stirrer into the bowl, through the downcomer, and into forming pipe 30. Forming pipe 30 is an open top vessel comprising converging sidewalls such that molten glass entering forming pipe 30 overflows the pipe and runs down the converging forming sidewalls as two separate flows of molten glass. At the bottom of the converging sidewalls the two separate molten glass flows rejoin to form glass sheet 31 having a pristine outer surface. A more thorough description of a fusion glass making process can be found in U.S. Pat. No. 3,338,696 to Dockerty, the content of which is incorporated herein by reference.

In a fusion-type glass making process, piping between the melting furnace 12 and forming pipe 30 (e.g. MFC 14, finer 16, FSC 18, stirrer 20, SMC 22 bowl 24 and downcomer 26) is generally formed from a refractory metal, for example platinum or a platinum alloy such as platinum-rhodium. On the other hand, forming pipe 30 is typically a monolithic refractory block made from a material such as zirconia.

Figure 2:
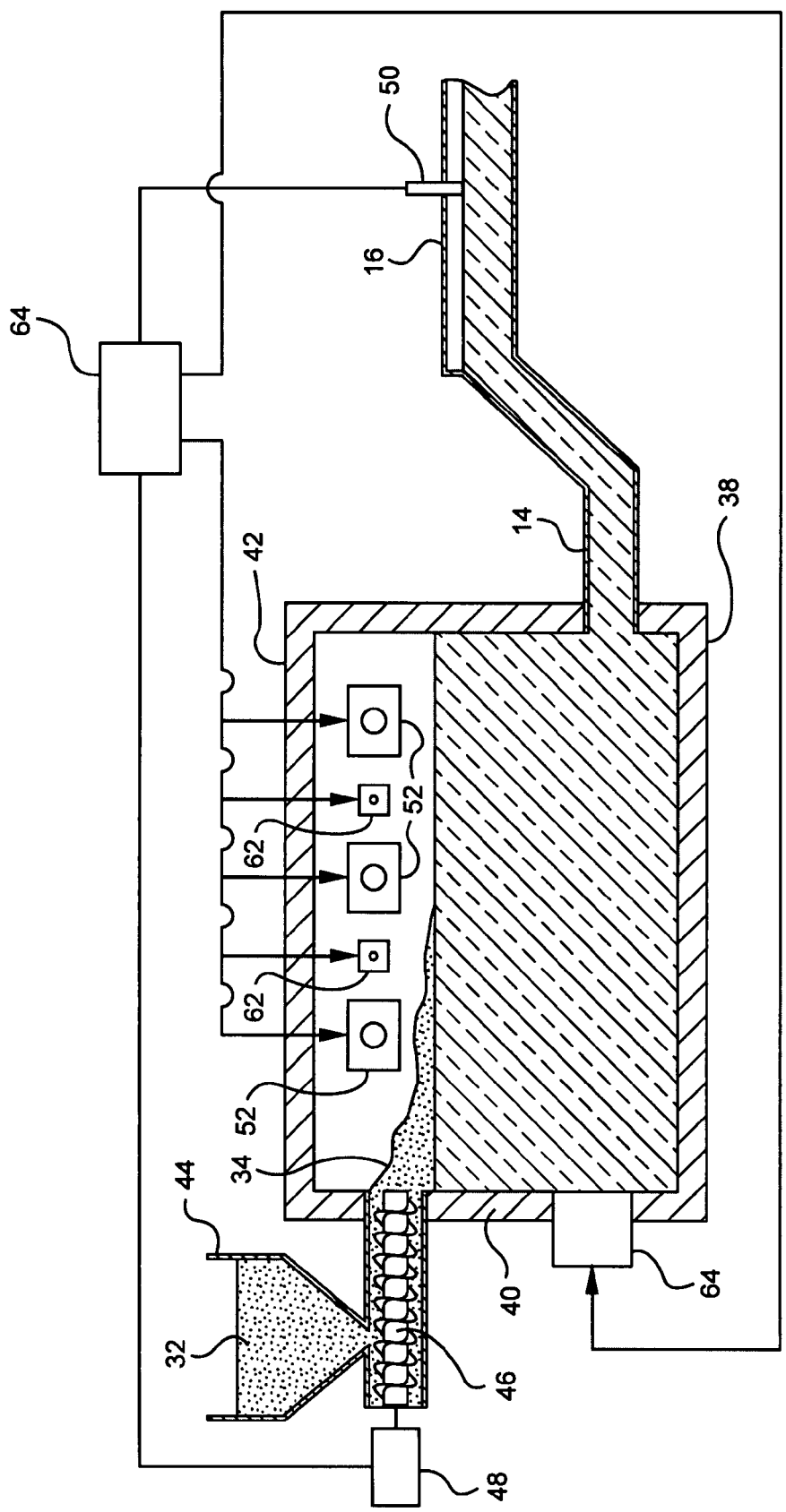
FIG. 2 is a cross sectional side view of the melting furnace of FIG. 1.

As illustrated in FIG. 2, furnace 12 comprises a bottom 38, sidewalls 40 and roof (crown) 42. Batch material from hopper 44 is charged into furnace 12 through inlet 34 via a screw feeder or auger 46 driven by motor 48 to form a blanket of batch material over at least a portion of the surface of the molten glass 36 within the furnace. The batch material may be charged into furnace 12 intermittently, or, more preferably, continuously, in response to a detected level of the molten glass. For example, the level of the molten glass may be sensed by molten glass level probe 50 inserted into piping downstream of melting furnace 12. Level probe 50 may be, for instance, a resistance type detector wherein a current flow varies with the amount of probe 50 that is washed (contacted) with molten glass. However, any conventional molten glass level detection system may be employed, including non-contact methods such as using microwave or optical sensors.

Figure 3:
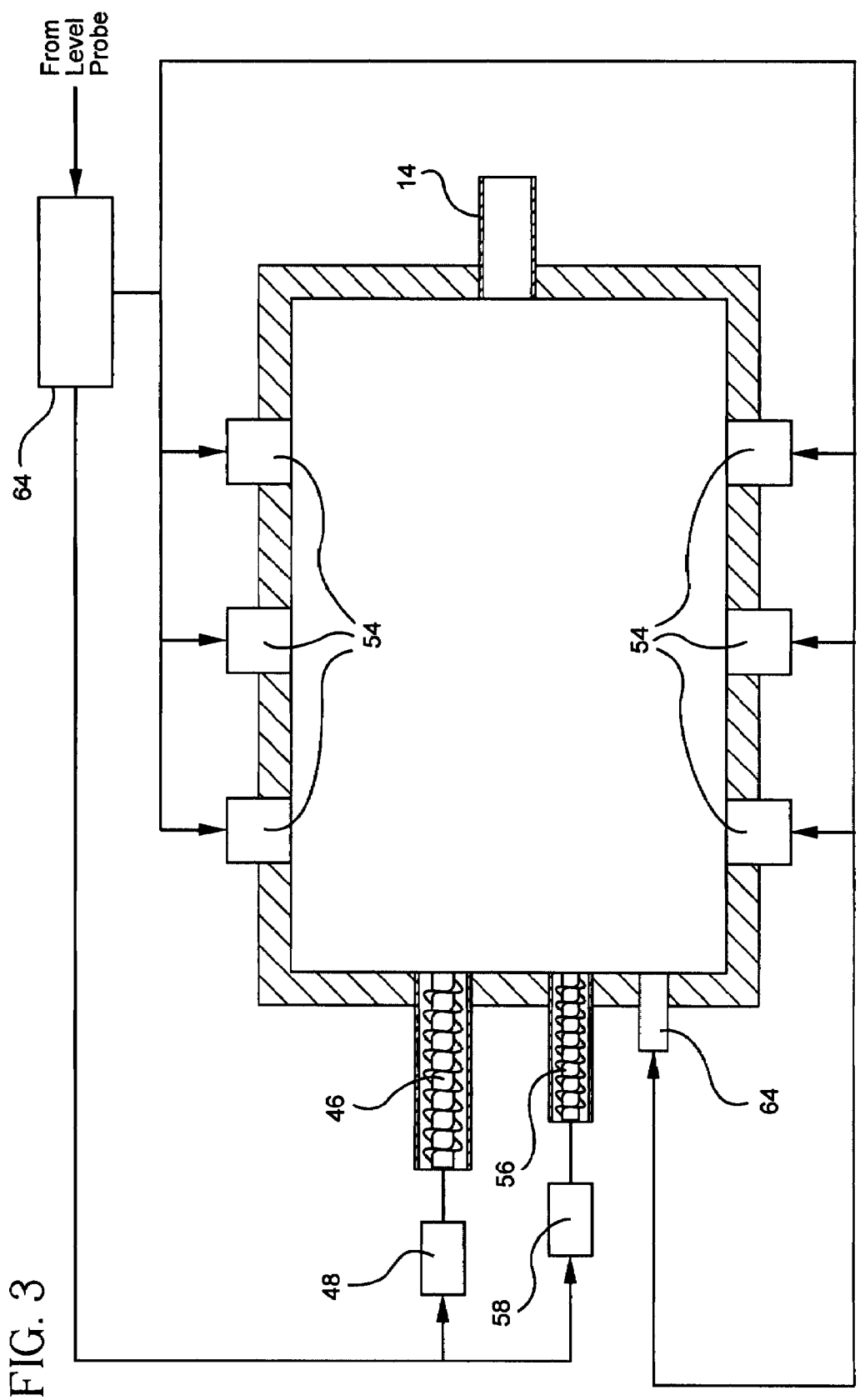
FIG. 3 is a top down cross sectional view of the melting furnace of FIG. 1 with the crown removed.

Crown burners 52 arranged along sidewalls 40 of furnace 12 burn a fuel-air or fuel-oxygen (i.e. fuel-oxidizer) mixture to heat the space between the batch material blanketing the molten glass and furnace crown 42. In addition, electrodes 54 arranged along sidewalls of furnace 12, best shown in FIG. 3, produce resistance heating of the glass melt by introducing an electric current through the molten glass from one electrode to another electrode.

Conventionally, methods of charging the melting furnace must be capable of keeping up with the amount of molten glass exiting the furnace, e.g. through MFC 14, such that the level of molten glass in furnace 12 is maintained substantially constant. Even for relatively small melting furnaces, the amount of batch material needed to maintain a constant level can be in excess of 500 pounds/hr. Screw feeders capable of providing a consistent flow are typically unable to vary their feed rate by small amounts. Thus, modifications to the feed rate are made in increments that may sometimes be in excess of what is needed, resulting in a melt level that oscillates about a target level until a new equilibrium level is reached.

Accordingly, the present embodiment further comprises trim feeder 56 driven by trim motor 58 and capable of providing much finer control of the feed rate than can be achieved with a significantly larger feeder, i.e. batch feeder 46. Preferably, trim feeder 56 is run so as to contribute equal to or less than about 10% of the total batch feed rate, preferably equal to or less than about 7% of the total feed rate, and more preferably equal to or less than about 5% of the total feed rate. In one embodiment, trim feeder 56 contributes equal to or less than 3% of the total batch feed rate. Thus, for a melting furnace that requires a batch feed rate of 1500 lbs/hr, trim feeder 56 run at 3% of the total batch feed rate should provide a batch feed rate no more than about 45 lbs/hr. The remaining 97% of the total batch feed rate is contributed by screw feeder 46. Feeders 46 and 56 may be fed from a single hopper or feeders 46 and 56 may be fed from separate hoppers. By providing a substantially smaller feed rate, trim feeder 56 facilitates a more gradual adjustment to the level of molten glass in melting furnace 12, thereby minimizing the oscillation or "hunting" that can occur in a conventional melting furnace using only the bulk batch feeder 46.

Level control may be accomplished by coupling level probe 50 with controller 60, wherein a measured level is compared with a predetermined level set point and a level difference signal generated. The level difference signal may then be used to drive trim motor 58, and trim feeder 56, to maintain a substantially constant molten glass level in melting furnace 12. In a more sophisticated approach, fuzzy logic tables may be used in a conventional manner to determine the needed drive signal supplied to trim feeder motor 58. The present invention can be used to control the molten glass level in melting furnace 12 such that the level varies less than about 0.25 inches, more preferably less than about 0.20 inches, even more preferably less than about 0.15 inches, and more preferably still less than about 0.1 inches.

Figure 4:
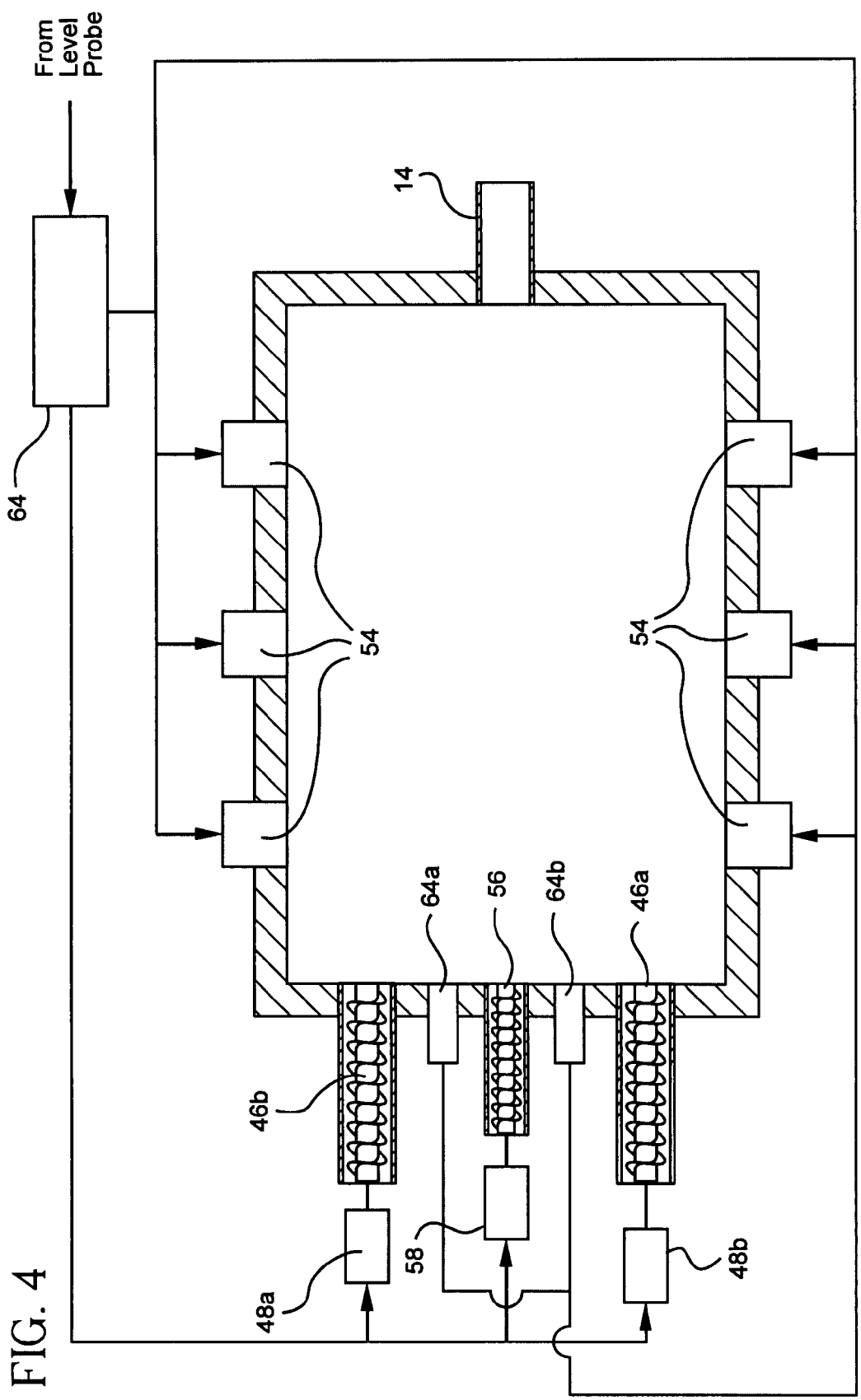
FIG. 4 is a top down cross sectional view of the melting furnace according to another embodiment of the present invention with the crown removed and a second bulk batch feeder installed.

Is should be apparent to one skilled in the art, having had the benefit of the present disclosure, that the approach described above may be extended to the method of heating the molten glass. That is, adjustments to the amount of batch material introduced into melting furnace 12 may contribute to undesirable variations in melt temperature. To minimize potential temperature variations, melting furnace 12 may further comprise trim burners 62 (FIG. 2) installed in side walls between the batch blanket and crown 42. Melting furnace 12 may also include one or more trim electrodes 64 installed in sidewalls 40 below the level of the glass melt surface. Preferably, the one or more trim electrodes 64 are installed proximate trim feeder 56. For example, the one or more trim electrodes may be located below and/or to the side of the trim batch feeder. For example, FIG. 4 illustrates two trim electrodes 64a and 64b placed to the sides of trim feeder 56.

Preferably, trim burners 62 and trim electrodes 64 should be sized such that the amount of power contributed to the melt is proportional to the variation in feed rate of batch material charged by trim feeder 56. That is, if the batch feed rate of the trim feeder increases to maintain the level of the glass melt for example, the power contributed by the trim burners and trim electrodes should increase proportionately. Again, assuming a total batch feed rate of 1500 lbs/hr, the trim burners and trim electrodes should be capable of supplying a total net power of about 15 kW to ensure an ability to compensate the range of batch material feed supplied by the trim feeder. Based on a trim feed rate of 45 lbs/hr, and wherein 1100 BTU/lb are assumed to be needed to melt the 45 lbs/hr of batch, equivalent to 3413 BTU/hr/kW, this is calculate to be 15 kW. That is, the trim burners and/or trim electrodes should be capable of supplying a total net power of about (1100 BTU/lb)*(trim feed rate)/(3413 BTU/hr/kW). Preferably, variation of the power output of the trim burners and/or trim electrodes can be accomplished in increments of less than about 1 kW, preferably less than about 0.5 kW, and more preferably less than about 0.1 kW. Trim Burners 62 and trim electrodes 64 may also be controlled by controller 60, for example through appropriate means such as mass flow controllers and relays/voltage/current regulators (not shown), respectively.

It should be understood that bulk screw feeder 46 may in fact comprise multiple bulk screw feeders. That is, as illustrated in FIG. 4, melting furnace 12 may comprise first bulk screw feeder 46a, second bulk screw feeder 46b and trim feeder 56. Carrying forth the example from above, if the total required batch feed rate is 1500 lbs/hr, screw feeders 46a and 46b are preferably set to provide 97% of the total feed rate, divided equally between the two feeders, while the remaining 3% of the total batch feed rate is contributed by trim feeder 56. Thus, bulk batch feeders 46a and 46b each contribute a batch flow of 43.5%, or about 773 lbs/hr, while the trim feeder 56 provides the remaining approximately 45 lbs/hr.

In operation, a practical method of initiating batch feed into the melting furnace is to begin feeding batch material into the furnace via trim feeder 56. For example, trim feeder 56 may be started at a feed rate of 1% of a total predetermined batch feed rate. One or more bulk batch feeders 46 may then be started and adjusted to supply the remaining 99% of the predetermined total batch feed rate. Thereafter, the one or more bulk batch feeders may be run at a constant output, such as via a constant RPM, and any variations in feed rate required to maintain a substantially constant level of molten glass may be performed using only the trim feeder. Of course, if the adjustment to total batch feed rate needed to maintain a substantially constant glass melt level exceeds the capacity of the smaller trim feeder, the one or more bulk batch feeders may be used, after which a new equilibrium feed rate should be established between the bulk and trim batch feeders as previously described.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of forming a glass melt comprising:
   providing a glass-forming batch material;
   feeding the batch material into a furnace from a bulk batch feeder at a bulk batch feed rate;
   feeding the batch material into the furnace from a trim batch feeder at a trim batch feed rate equal to or less than 10% of a total batch feed rate that is the sum of the bulk batch feed rate and the trim batch feed rate;
   heating the batch material in the furnace to form a glass melt;
   determining a level of the glass melt; and
   varying the trim batch feed rate in response to the level of the glass melt while maintaining the bulk batch feed rate constant.

2. The method according to claim 1 wherein the trim batch feed rate is equal to or less than 5% of the total feed rate.

3. The method according to claim 1 wherein the trim batch feed rate is equal to or less than 3% of the total feed rate.

4. The method according to claim 1 wherein the feeding at a bulk batch feed rate comprises feeding the batch material from a plurality of bulk batch feeders.

5. The method according to claim 1 wherein the determining the level of the glass melt comprises sensing the level of the melt with a sensor.

6. The method according to claim 5 wherein the level of the glass melt is sensed downstream of the furnace.

7. The method according to claim 5 wherein the sensed level of the glass melt is compared to a predetermined level value, and the difference between the sensed level and the predetermined level value is used to vary the trim batch feed rate.

8. The method according to claim 1 wherein the heating is performed by heating means, and a power output of the heating means is varied proportional to the variation in trim batch feed rate.

9. The method according to claim 8 wherein the heating means is a combustion flame.

10. The method according to claim 8 wherein the heating means is an electric current.

11. A method of maintaining a substantially constant level of a glass melt in a furnace comprising:
    providing a glass-forming batch material;
    feeding the batch material into the furnace from a first batch feeder at a first batch feed rate;
    feeding the batch material into the furnace from a second batch feeder at a second batch feed rate equal to or less than 3% of a total batch feed rate;
    heating the batch material in the furnace to form the glass melt;
    determining a level of the glass melt; and
    varying the second batch feed rate in response to the level of the glass melt.

12. The method of according to claim 11 wherein the determining comprises a level sensor located downstream of the melting furnace.

13. The method according to claim 11 wherein the heating is performed by heating means, and a power output of the heating means is varied proportional to the variation in the second batch feed rate.

14. The method according to claim 11 wherein the determined level of the glass melt is compared to a predetermined level value, and the difference between the determined level and the predetermined level value is used to vary the trim batch feed rate.

15. The method according to claim 11 wherein the first batch feed rate is maintained substantially constant during the varying of the second batch feed rate.

* * * * *